US010652671B2

(12) United States Patent
Meier et al.

(10) Patent No.: US 10,652,671 B2
(45) Date of Patent: May 12, 2020

(54) METHOD OF OPERATING A HEARING DEVICE

(71) Applicant: Sonova AG, Staefa (CH)

(72) Inventors: Hilmar Meier, Herrliberg (CH); Reto Kurmann, Staefa (CH); Nadim El Guindi, Zürich (CH); Thomas Wessel, Männedorf (CH); Stefan Launer, Zürich (CH)

(73) Assignee: Sonova AG, Staefa (CH)

( * ) Notice: Subject to any disclaimer, the term of this patent is extended or adjusted under 35 U.S.C. 154(b) by 31 days.

(21) Appl. No.: 16/060,483

(22) PCT Filed: Dec. 15, 2015

(86) PCT No.: PCT/EP2015/079723
§ 371 (c)(1),
(2) Date: Jun. 8, 2018

(87) PCT Pub. No.: WO2017/101978
PCT Pub. Date: Jun. 22, 2017

(65) Prior Publication Data
US 2018/0359574 A1  Dec. 13, 2018

(51) Int. Cl.
H04R 25/00 (2006.01)
G06F 21/12 (2013.01)
(Continued)

(52) U.S. Cl.
CPC ......... *H04R 25/505* (2013.01); *G06F 21/121* (2013.01); *G06F 21/57* (2013.01);
(Continued)

(58) Field of Classification Search
CPC .. H04R 25/70; H04R 25/558; H04R 2225/55; H04R 2225/39
See application file for complete search history.

(56) References Cited

U.S. PATENT DOCUMENTS 7,792,676 B2 * 9/2010 Klinefelter ............. H04R 25/70
704/271
8,321,921 B1  11/2012 Ahmed et al.
(Continued)

FOREIGN PATENT DOCUMENTS

WO  2013020045 A2  2/2013
WO  2015028050 A1  3/2015

OTHER PUBLICATIONS

International Search Report and Written Opinion; International Application No. PCT/EP2015/079723; Applicant: Sonova AG; filed Dec. 15, 2015, dated Apr. 4, 2016; 13 pages.

*Primary Examiner* — Matthew A Eason

(57) ABSTRACT

There is provided a method of operating a hearing device (10, 11) to be worn by a user, comprising: defining a plurality of hearing device services and assigning to each hearing device service a service access confirmation level selected from a plurality of hierarchically structured service access confirmation levels; providing an access software platform for enabling third party service access to the hearing device services; providing at least one application program adapted to provide a third party service to the hearing device, each application program adapted to utilize the access software platform and at least one of the hearing device services; providing a manufacturer access service for approving or denying access to the hearing device for each of the application programs depending on whether or not approval for the respective service access confirmation level(s) has been previously obtained.

11 Claims, 5 Drawing Sheets

(51) Int. Cl.
*G06F 21/57* (2013.01)
*G06F 40/58* (2020.01)
*G06K 9/62* (2006.01)

(52) U.S. Cl.
CPC ........... *G06F 40/58* (2020.01); *G06K 9/6267* (2013.01); *H04R 25/554* (2013.01); *H04R 25/70* (2013.01)

(56) References Cited

U.S. PATENT DOCUMENTS

| | | |
|---|---|---|
| 2009/0222405 A1 | 9/2009 | Cara et al. |
| 2015/0200948 A1 | 7/2015 | Cairns et al. |
| 2017/0006389 A1* | 1/2017 | Pedersen ................ H04R 25/55 |
| 2017/0201839 A1* | 7/2017 | Manchester ......... H04R 25/554 |
| 2017/0286918 A1* | 10/2017 | Westermann .......... G06Q 10/20 |
| 2018/0342320 A1* | 11/2018 | Westermann ......... H04W 48/18 |

* cited by examiner

METHOD OF OPERATING A HEARING DEVICE

The invention relates to a method of operating a hearing device to be worn by a user in such a manner that the hearing device may not only provide services to the user which are implemented by the manufacturer of the hearing device, but in addition services developed by third parties.

Today, the functionalities of hearing instruments are typically defined, developed, configured and fitted by the original manufacturers of the hearing instruments. For this purpose, manufacturers of hearing instruments use different tools, such as manufacturing tuning and configuration tools or manufacturer-specific fitting tools. Typically, developers of third party functionalities for hearing instruments or other smaller hearing instruments retailers have no possibilities to get access or deliver new functionalities to hearing instruments apart from the standard audio and control interfaces, such as Bluetooth.

Several concepts are described in the prior art of how services offered by a third party may be provided to hearing instruments.

WO 2015/028050 A1 relates to a system wherein a remote server offers via a communication network various hearing instrument services, primarily concerning configuration and control of the hearing instrument. The access to such "cloud services" may require subscription/payment by the user of the hearing instrument. The cloud services may be used by an audiologist for hearing instrument fitting, support, maintenance and diagnostics. The hearing instrument may be directly connected to the remote server via the communication network or indirectly via a communication/computing device. The communication/computing device and the hearing instrument may be connected "indirectly" via the remote server or "directly" via the communication network; the connection always requires authentication of communication/computing device and the hearing instrument via the remote server in order to protect the hearing instrument.

US 2013/0142367 A1 relates to a method wherein a hearing instrument is connected to a third party system, e.g. a remote server of the manufacturer, via a mobile consumer device, e.g. a smartphone, which is connected to the remote server via a network connection, and which is connected to the HI via a wireless communication channel. Thereby services like diagnoses and firmware update may be provided to the hearing instrument. The mobile consumer device may be e.g. used as a remote control or user interface of the hearing instrument. Access to the hearing instrument may require entering a password by the user or an audiologist in order to connect the hearing instrument to the third party system.

US 2008/0298614 A1 relates to a method wherein a hearing instrument may be adjusted or reprogrammed by a third party service based on individual user data stored in a remote data base for optimizing sound event perception, e.g. in a theater; the access to the remote user data base is restricted, e.g. allowed for registered users only.

WO 2013/091693 A1 relates to a method for remotely controlling, e.g. from a manufacturer's data base or a smartphone, a hearing instrument, wherein the availability of functions/services of the HI may depend on authorization of the user, e.g. by the IMEI of his smartphone, and/or on status information of the hearing instrument ("defect", "stolen", "fitted", etc.) as stored in the data base or on the smartphone; the smartphone may connect to the database via a communication network. A unique identification code is assigned to the hearing instrument and is stored on the hearing instrument and also in the data base and the smartphone, with the status information and the user identification information being assigned to the unique identification code.

US 2014/0211973 A1 relates to a method wherein a hearing instrument may be used for user identification for a device, e.g. a computer, with a key or password being sent from the hearing instrument to the device.

U.S. Pat. No. 7,499,560 B2 relates to a method wherein a unified command set spanning hearing device families and generations is provided in order to achieve a universal software for adaptation of hearing instruments; for example, this allows small and specialized software modules for hearing instrument control via a smartphone.

U.S. Pat. No. 7,283,842 B2 relates to a method of fitting a hearing instrument, wherein a mobile phone is communicatively connected both to the hearing instrument and to a remote server and then is used as a relay for enabling data/program exchange between the hearing instrument and the remote server; the mobile also serves as a user identification by the remote server.

WO 2008/060388 A2 relates to methods for protecting media content, such as videos and music, which can be accessed via a network by using conditional access trusted, digital rights management and trusted domain policies.

It is an object of the invention to provide for a method of operating a hearing instrument wherein third party services may be implemented in a safe and controlled manner so as to guarantee compliance with privacy and security regulations.

According to the invention, this object is achieved by a method as defined in claim 1.

The invention is beneficial in that, by providing for an initialization procedure for each application program, wherein a service certification for the application program is obtained by submitting a service certification request to the manufacturer access service, including all requested confirmations for the hearing instrument services used by the respective application program, with these confirmations including confirmation of the acceptance of the third party access of the respective service by the user, the provision of third party services to the hearing instrument is enabled in a relatively convenient, safe and controlled manner which guarantees compliance with privacy and security regulations.

Preferred embodiments of the invention are defined in the dependent claims.

Hereinafter, examples of the invention will be illustrated by reference to the attached drawings, wherein.

Figure 1:
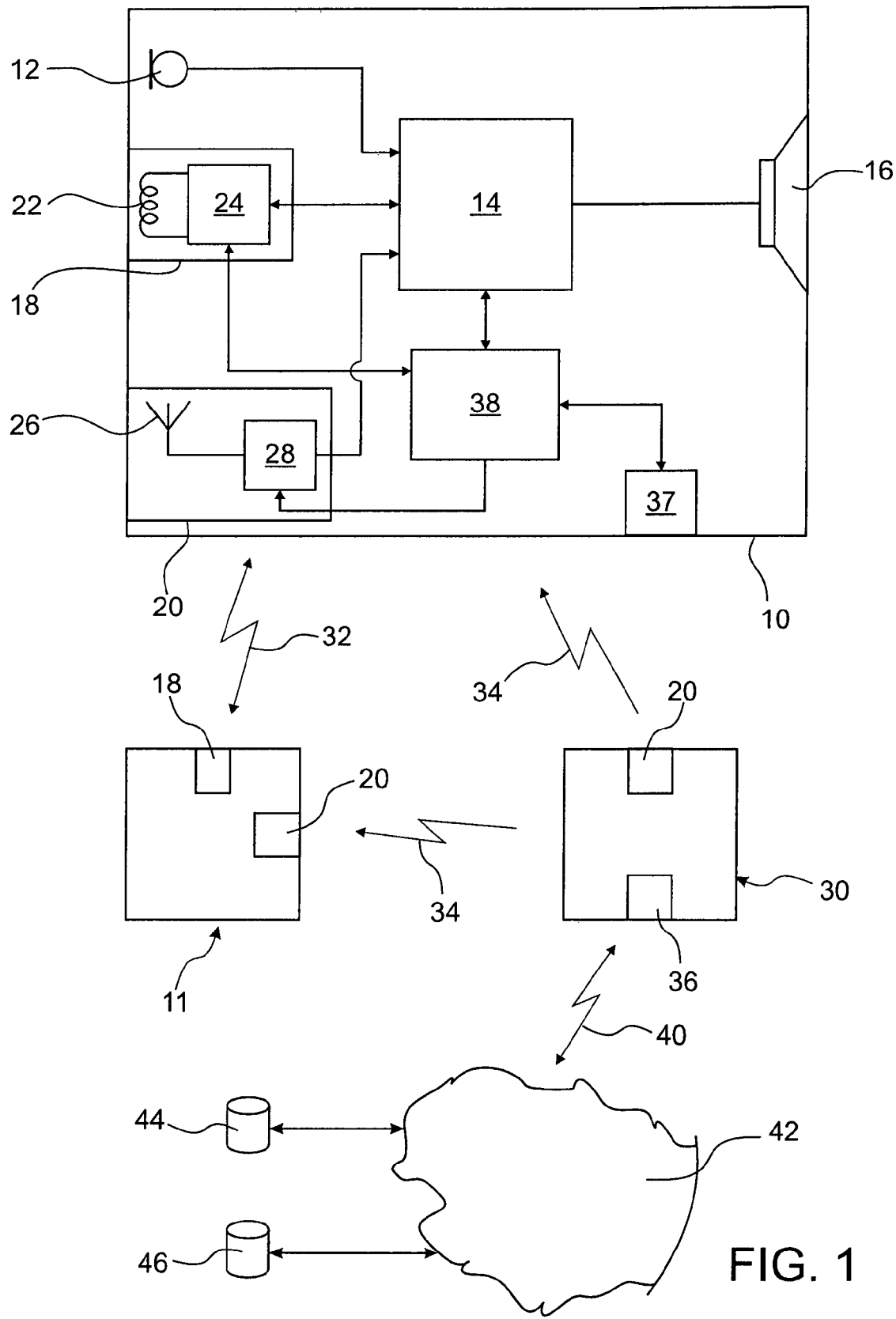
FIG. 1 is a schematic block diagram of a system to be used in a method according to the invention.

FIG. 1 is a schematic representation of an example of a hearing system to be used with the invention, comprising a first hearing device 10 worn at one ear of a user and a second hearing device 11 worn at the other ear of the user. The hearing devices 10, 11 may exchange between each other via a wired or wireless link 32 in order to implement a binaural hearing assistance system. Further, the hearing devices 10, 11 are able to communicate with a personal communication device 30 of the user via a wireless link 34.

The personal communication device 30 may be handheld or body-worn device, such as a smartphone, a tablet computer or a personal digital assistant, including smartwatches, smartglasses or smartwear ("personal" in this regard includes also shared or rented/borrowed items). According to another example, the personal communication device may be personal computer.

The hearing assistance devices 10, 11 may be hearing aids, such as BTE (behind the ear), ITE (in the ear) or CIC (completely in the channel) hearing aids. However, the hearing assistance devices, for example, also could be an auditory prosthesis, such as a cochlear implant device. According to another example, the hearing assistance devices could form a headset or headphones for a normal hearing person.

According to the example of FIG. 1, the hearing assistance devices 10, 11 are electro-acoustic hearing aids comprising a microphone arrangement 12 for capturing audio signals from ambient sound, an audio signal processing unit 14 for processing the captured audio signals and an electro-acoustic output transducer (loudspeaker) 16 for stimulation the user's hearing according to the processed audio signals (these elements are shown in FIG. 1 only for the hearing aid 10).

In the example of FIG. 1, the hearing aids 10, 11 comprise a first wireless interface 18 including an antenna 22 and a transceiver 24 and a second wireless interface 20 including an antenna 26 and a transceiver 28.

The first interface 18 is provided for enabling wireless data exchange between the first hearing aid 10 and the second hearing aid 11 via the wireless link 32 which, according to one example, may be an inductive link which may operate, for example, in a frequency range of 6.765 MHz to 13.567 MHz, such as at 10.6 MHz. For example, the first interface 18 may be designed to form part of a hearing instrument body area network (HIBAN). However, rather than being implemented as an inductive link, the wireless link 32 may be a far-field link, such as a proprietary digitally modulated link operating in the 2.4 GHz ISM band, or a standard link, such as Bluetooth.

The link 32 serves to realize a binaural hearing assistance system, allowing the hearing aids 10, 11 to exchange audio signals and/or control data and status data, such as the present settings of the hearing aids 10, 11.

The second interface 20 is provided for data exchange via the wireless link 34 with the personal device 30. For example, the second interface 20 may be adapted to operate in a frequency range of 0.38 GHz to 5.825 GHz, preferably at frequencies around 2.4 GHz in the ISM band. For example, the second interface 20 may be a Bluetooth interface, a WLAN (WiFi) interface or a GSM interface. Preferably, it is a Bluetooth interface.

The hearing aids 10, 11 also comprise a controller 38 for controlling operation of the hearing aids 10, 11, with the controller 38 acting on the signal processing unit 14 and the transceivers 24 and 28. Further, hearing aids 10, 11 comprise a user interface 37, such as a press button and/or toggle switch, for enabling user interaction with the hearing aids 10, 11.

The personal device 30 likewise comprises an interface 20 for transmitting data/signals via the external data link 34 to the hearing aids 10, 11.

The binaural link 32 may be a wireless link, as shown in FIG. 1, or it may be a wired link for example when the hearing system is a headphone or when the hearing system is composed of two earpieces connected with a flexible cable.

In case that the binaural link 32 is a wireless link, the protocol/interface for the binaural link 32 and the external data link 34 may be the same (in this case the interface 20 used for the binaural link 32 also could be used for data reception from the external device 60 via the link 34) or it may be different (requiring two separate interfaces 18, 20 for the links 32 and 34, respectively); the protocol/interface may be proprietary or it may be standard-based (such as Bluetooth, WLAN or GSM).

The personal device 30 may comprise a further wireless interface 36 for connecting, via a wireless link 40, to a communication network 42, such as the internet. The interface 36 may be, for example, a WiFi interface.

The system of FIG. 1 further comprises a data processing facility 44 (typically a server), which is used by the manufacturer of the hearing instruments 10, 11 to provided remote services for hearing instruments 10, 11, and a data processing facility 46 (typically a server), used by a third party which offers services for the hearing instruments 10, 11; both facilities 44 and 46 are connected to the communication network 42. The facilities 44 and 46 allow for communication/data exchange between the personal device 30 (and, via the personal device 30, also with the hearing instruments 10, 11) and the hearing instrument manufacturer or the third party, respectively, or between the hearing instrument manufacturer and the third party.

In general, it is desirable for the hearing instrument user to have the opportunity to operate the hearing instruments not only with the services implemented by the manufacturer, but in addition with services offered by third party service providers, so as to more flexibly adjust the operation of the hearing instruments to the user's individual needs. Further, it is also desirable for the hearing care professional (HCP), who is usually responsible for the individual fitting of the hearing instruments to the user, to have a certain degree of control over certain functions and services provided by the hearing instruments (for example, the HCP may want to disable the volume control function for a specific user for an acclimatization period). However, such flexibility of the hearing instrument operation may interfere with privacy and security regulations. Therefore it is necessary that the manufacturer of the hearing instrument imposes certain confirmation/certification requirements on the access of hearing instrument services by third party application programs.

Accordingly, the invention relates to a method of allowing controlled third party access to hearing instrument functions or data in order to enable third party application programs running on a cloud server or on a personal communication device, such as a smartphone (or even as an instance or service on the hearing instrument), of the hearing instrument user to utilize hearing instrument functions/data for providing third party services to the hearing instrument.

Control of the third party access to the hearing instrument services may include the following measures:

The manufacturer defines a plurality of hearing instrument services which may be used by a third party and assigns to each hearing instrument service a certain one out of a plurality of hierarchically structured service access information levels (this means that a certain confirmation level already requires confirmation of all higher confirmation levels) with the service access confirmation levels at least including: confirmation of the availability of the service for third party access (hereinafter referred to as confirmation level "L2") and confirmation of the third party access of the service by the user of the hearing instrument (confirmation level "L5"); typically, there may be intermediate service access confirmation levels in between these highest and lowest confirmation levels; for example, the service access confirmation levels further may comprise: confirmation of the availability of the service for the given type of hearing instrument (confirmation level "L3"), and/or confirmation of the availability of the service for the given user of the hearing instrument (confirmation level "L4")

The manufacturer provides for an access software platform for enabling third party service access to the hearing instrument services; typically, such access of the platform may be implemented as a program library package. Further, the access of the platform also may enable access to remote manufacturer services, such as registration of an application program provided by the third party, hearing instrument information, hearing instrument user information, software/firmware updates of the hearing instrument and fitting information.

At least one application program is provided by the third party, the application program enabling a third party service being provided to the hearing instrument; the application program utilizes the access software platform and at least one of the hearing instrument services.

A manufacturer access service is provided by the manufacturer for approving or denying access to the hearing instrument for the application program, depending on whether or not approval for the respective service access confirmation levels has been previously obtained. According to one example, the manufacturer access service may be provided as part of the access software platform; according to an alternative example, the manufacturer access service may be provided via a communication network, such as the internet, as a remote service.

In order to obtain access to the required hearing instrument services, the application program has to undergo an initialization procedure: first, the application program has to obtain confirmation of the respective service access confirmation levels assigned to the hearing instrument services used by the application program; thereafter, a service certification request has to be submitted with regard to the hearing device services used by the application program to the manufacturer access service, the service certification request including the obtained confirmations of the service access confirmation levels; in addition, the request may include several identifiers: a program identifier associated with the application program in order to identify the application program by the access software platform, a hearing instrument identifier associated with the hearing instrument in order to identify the hearing instrument by the access software platform, a user identifier associated with the user of the hearing instrument for identifying the user by the access software platform and/or the manufacturer access service, and, if a personal communication device is used together with the hearing instrument, a communication device identifier associated with the personal communication device in order to identify the personal communication device by the access software platform (alternatively, the individual device identifiers may be replaced by a user login (based on the user identifier) or by a group identifier common to all devices of the user); as the last step of the initialization procedure, the manufacture access service checks whether the service certification request includes all required confirmations of the service access confirmation levels and, if so, transmits a respective service certification to the application program or the access software platform, wherein the access software platform enables access to the hearing device services to be used by the application program if the respective service certification has been received by the application program or the access software platform, respectively.

Typically, the acquired confirmation is organized in a service-wise manner, so that for each application program a separate service certification is requested, with a confirmation of all hearing instrument services to be used by the respective application program being required for obtaining access to the hearing instrument services by the application program. However, since such separate confirmation for each service access may be inconvenient for the user due to a frequent need to manually confirm the L5 confirmation level by the user. In some cases it may be preferred to have a hearing system-wise, an application-wise or a provider-wise confirmation structure. With an hearing system-wise confirmation structure, the user uses a plurality of hearing instruments, such as the binaural system of FIG. 1, wherein a service certification obtained for an application program for one of the hearing instruments of the user is sufficient for the application program for all of the hearing instruments of the user for obtaining access to the hearing instrument services of all of the hearing instruments of the user by the application program. In other words, once a service access has been confirmed for one of the hearing instruments of the user, such confirmation is valid also for the other hearing instruments of the user. An application-wise confirmation means that the user confirms access for the application to use all services which the application needs (once for all services used by the application); the idea is that the user trusts this app and does not care if the application uses the microphone and/or button or other services of the hearing instrument (s). With a provider-wise confirmation structure, there is a plurality of application programs from the same third party service provider, wherein a single service certification obtained for one of the application programs from that provider is sufficient for all of the application programs from that provider for obtaining access to the hearing instrument services by the respective application program. In other words, a confirmation obtained for one of the application programs of a certain provider is valid also for the other application programs of the same provider.

Once the initialization procedure has been successfully finished once by an application program, i.e. once the service certification has been received for that application program, for any subsequent service request from the application program the access software platform only has to check the existing certification before processing the request (the certification is either owned by the access software platform or the application program).

With regard to the confirmation level L2 (availability of the service for third party access) it is noted that the confirmation preferably may be obtained from the access software platform (the software library package declares that it provides the service) or from the manufacturer access service (the manufacturer service confirms availability against an identification of the library package version).

With regard to the confirmation level L3 (availability of the service for the given type of hearing instruments) it is noted that the confirmation may be obtained from the hearing instrument, the access software platform or the manufacturer access service (via the communication network).

With regard to the confirmation level L4 (availability of the service for the given user of the hearing instrument) it is noted that such confirmation may be obtained from the hearing instrument or the manufacturer access service (via the communication network), wherein the user is identified by a user identifier associated with the user. The confirmation level L4 typically is determined by the HCP responsible for fitting of the hearing instrument, i.e. the HCP may determine whether a certain hearing instrument service should be accessible by a third party application program at the present point in time (for example, during certain phases of the fitting process, such as during an acclimatization phase the HCP may determine that the volume control function should be disabled for that specific instrument user). Such "settings" by the HCP are known to the manufacturer access service, e.g. via an appropriate database, and can be retrieved via the user identifier.

Concerning the confirmation level L5 (acceptance by the user) it is noted that the confirmation may be obtained by user action on a user interface of the hearing instrument or by user action on a user interface of the personal communication device (if used together with the hearing instrument). To this end, the access software platform may adjust confirmations of the hearing instrument or the personal communication device in a manner so as to provide for such user interface for confirmation of the L5 level by the user. For example, the user confirmation may be provided by pressing a certain button at the hearing instrument (or the personal communication device) or by scratching on the hearing instrument microphone.

As already mentioned above, the access software platform preferably is implemented as a program library package. It may be configured to provide documentation required for access of hearing instrument services by a third party application program, such as information concerning the hearing instrument interfaces, the available hearing instrument services, the required initialization procedure, and/or implementation guidelines. In other words, the access software platform provides the information to the third party application program developer required for developing the application program which interacts with the access software platform at the hearing instrument.

The access software platform may be further configured to provide, via a communication network, the application program with an access to (remote) manufacture services, such as registration of the application program, hearing instrument information, software/firmware updates and fitting information.

Further, as already mentioned above, the access software platform is configured to submit the service certification requests and to check whether a valid certification has been obtained for the respective application program.

Typically, the internal software of the hearing instrument and the configuration of the hearing instrument are protected against modifications by third party services/third party application programs for safety reasons, in particular to ensure that the hearing instrument remains the product that was produced by the manufacturer, sold by the HCP and customized by the HCP for the user. Thereby, high product performance can be ensured; for example, the maximum power output limit is guaranteed so as to avoid uncomfortable hearing impressions or dangerous sound levels. However, the manufacturer nevertheless may use updates or upgrade services (for example through trusted connections) in order to modify hearing instrument functionalities and/or services.

Examples of hearing instrument services which may be accessible by third party application programs include: streaming of audio signals captured by a microphone arrangement of the hearing instrument to the application program (thereby providing access to the hearing instrument microphones); providing access to data indicative of the status of the hearing instrument and/or data logged during use of the hearing instrument, such as battery level, user control events (push button has been pressed or toggle switch has been pressed), classifier status (i.e. result of an auditory scene analysis), etc.; providing access to adjustment of operation parameters of the hearing device, such as volume control and/or hearing program selection; processing of audio signals supplied from the application program to the hearing instrument, such as processing by noise reduction, beamforming, speech enhancement and/or feedback cancelling; and stimulation of the user's hearing by sound signals, via the hearing instrument loudspeaker, according to input from the application program, such as speech messages and/or alert signals (such as beep signals).

Examples of third party services provided to the hearing instrument may include: providing speech translation services, wherein an audio signal speech input captured by the hearing instrument is translated into an audio signal speech output in another language; providing medical data analysis (provided that the hearing instrument is equipped with the appropriate sensors (as confirmed by a confirmation level L3 confirmation) the following data could be acquired and analyzed: heart rate, blood pressure, blood oxygen levels, body temperature, activity/movement/step counter); and generating speech messages to be supplied as an audio signal output to an output transducer (loudspeaker) of the hearing instrument, such as speech messages concerning an agenda (of an office organizer program) and/or the use of the hearing device (i.e. use instructions) and/or geographic location-related information (e.g. names of streets and other geographic locations).

Figure 2:
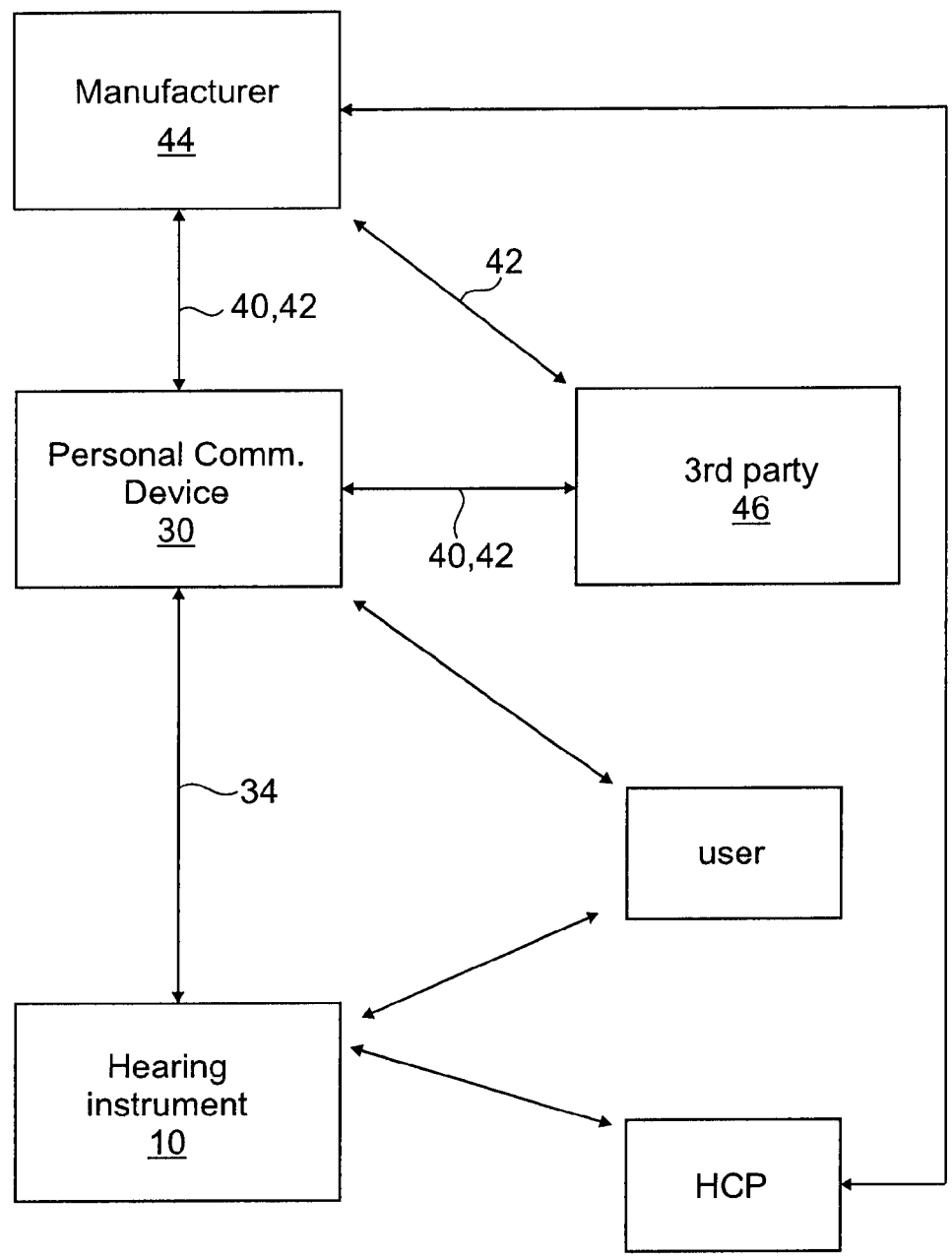
FIG. 2 is a block diagram of the interaction of devices and participants when carrying out a method according to the invention.
Figure 3:
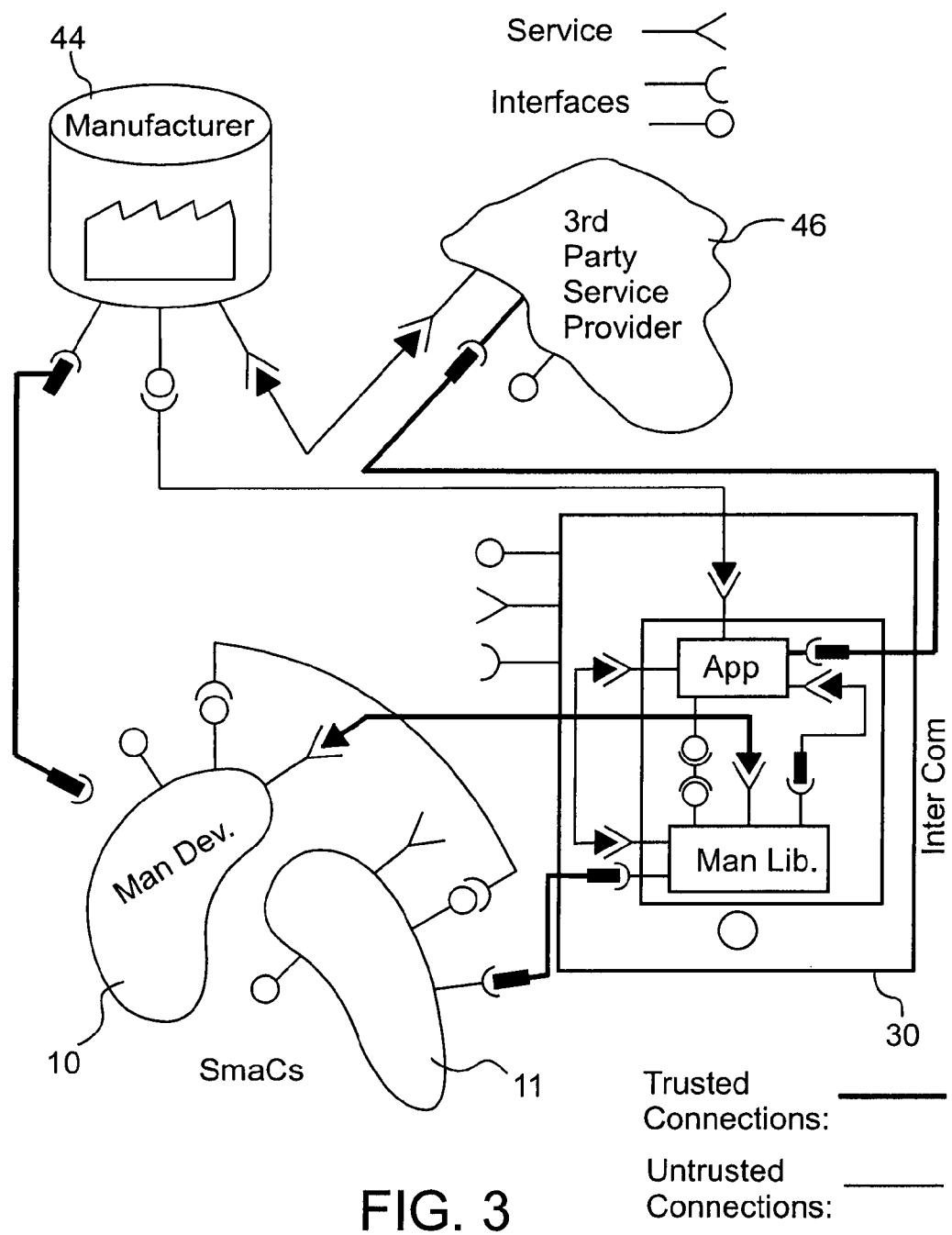
FIG. 3 is a more detailed representation of the interaction of devices and participants in a method according to the invention.

There are several basic configurations in which the operating methods of the invention may be applied. According to a preferred embodiment, the hearing instrument 10, as shown in FIG. 2, is used with a personal communication device 30 which communicates via a communication network 42 with the manufacturer of the hearing device, i.e. with a data processing facility 44 of the manufacturer, and which communicates via a wireless link 34 with the hearing instrument 10; further, the communication device 30 may communicate with the third party application provider, i.e. with a respective data processing facility 46, via the communication network 42. At the beginning of the third party application program development process, the manufacturer may provide the third party service provider with the access software platform including all information required for the developer to develop the application program. The application program, together with the respective elements of the access software platform, then is provided by the third party provider via the communication network 42 to the personal communication device 30, for example as an "app" which can be purchased in an internet app store. Typically, the application program undergoes some certification process by the manufacturer before the application program is published and offered to the user of the hearing instrument (such manufacturer pre-certification process may include explicitly reviewing the application program source prior to publishing the application program; applying a verification and certification protocol for the application program publisher as defined by the manufacturer; applying acceptance test criteria defined by the manufacturer, etc.). The application program has to declare the required permission levels to request hearing instrument services in its source code through a "manifest".

When the application program is installed on the personal communication device 30, it is in an unapproved/uncertified state. Before it can be actually used with the hearing instrument 10, the application program has to be configured to use the hearing instrument 10, whereupon the application program registers itself in the access software platform. It then connects to the hearing instrument 10 via the link 34 and goes through the above described initialization process so as to obtain, as a result of a successful certification request, the required service certification, so that after the initialization process the application program is in an approved/certified state and can access the required hearing instrument services without the need for further confirmations by the user.

In the configuration of FIG. 2 the access of the platform is typically provided as a program library package on the personal communication device 30, and the application program is run, it least in part, on the personal communication device 30 when interacting with the hearing instrument 10. During execution of the application program, the personal communication device 30 may be connected with a data processing facility 46 of the third party in case that the application program requires external input from the third party service provider.

Figure 4:
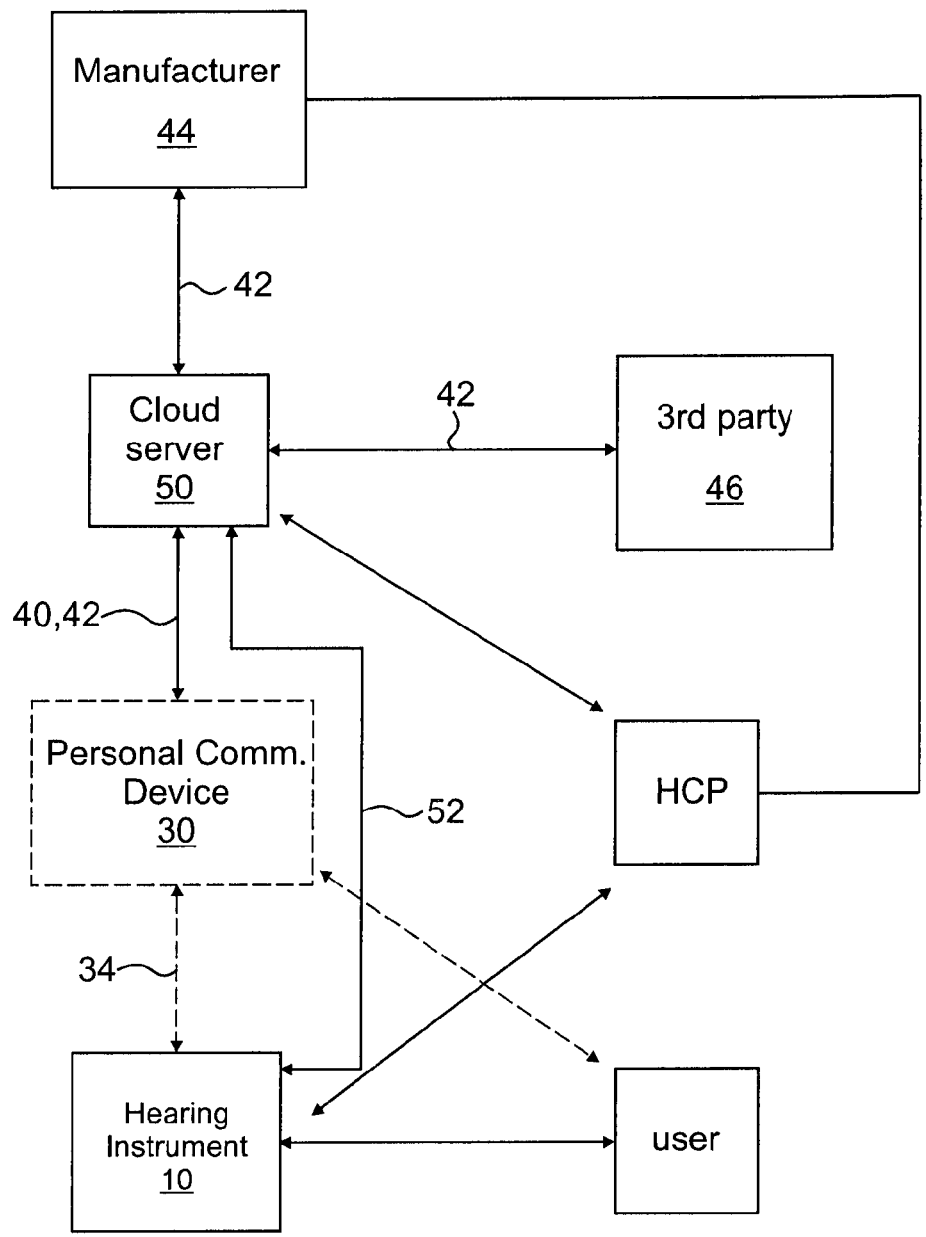
FIG. 4 is a representation similar to FIG. 2, wherein, however, an alternative example is shown.

An alternative system configuration is shown in FIG. 4, wherein the application program is run on a cloud server 50 and wherein the access of the platform is provided as a program library package to the cloud server 50. The cloud server 50 may be connected with respective data processing facilities 44, 46 of the manufacturer and the third party service provider via a communication network 42. Further, the cloud server may be, according to one embodiment, directly connected with the hearing instrument 10 via a link 52 which includes a communication network and a wireless connection of the hearing instrument 10 to the communication network. According to a variant, the communication between the cloud server 50 and the hearing instrument 10 may occur "indirectly" via a personal communication device 30 which is used by the hearing instrument 10 as an access to the communication network 42; the hearing instrument 10 and the personal communication device 30 may communicate via a wireless link 34.

As already mentioned above, the application program may be run, at least in part, also on the hearing instrument 10. This applies both to the embodiments of FIG. 2 and FIG. 4.

In general, the application program may be installed and configured at home by the user of the hearing instrument 10, or it may be installed and configured during a fitting session in the office of the HCP, including the required certification/initialization process.

It is also to be mentioned that the availability of hearing instrument services may depend not only on the required confirmation levels but also on additional parameters, such as the runtime status of the hearing instrument, such as battery status or sound classifier status, the time since the last boot-up, the time since the last fitting session, etc. Further, the availability may depend on, for example, credit units available for a certain service; for example, a user who owns a basic hearing instrument could use services of a premium hearing instrument by buying credits for a specific service, for example for a certain time interval or for a certain number of uses of the service.

In certain situations repetition of the initialization procedure may be necessary, i.e. under certain circumstances it may be necessary to obtain an update of the service certification.

According to one example, it may happen that one or more of the confirmations used in the initialization procedure may be withdrawn later. For example, the user may withdraw a previous confirmation of the acceptance of the third party access (L5 confirmation); such withdrawal may be carried by the user acting on the personal communication device 30. According to another example, the withdrawn confirmation may be the availability of the service for the given user of the hearing instrument (i.e. L4 confirmation); for example, the HCP may withdraw L4 confirmation by acting on the cloud server 50 (i.e. the confirmation is withdrawn remotely; in general, the information that confirmation is withdrawn has to reach the access platform, this could happen through a push mechanism either via the manufacturer server or the third party server, i.e. the HCP could login to the manufacturer server or the third party server to withdraw the confirmation and this information is then pushed to the access platform).

According to another example, repetition of the initialization procedure may be necessary, because the service certification has limited validity; for example, the validity of the service certification may be limited to a certain time interval (e.g., one month) or to a limited number of uses of the respective application program (e.g., the validity may be limited to ten uses). According to another example, the validity may be limited to some kind of one-time lease which requires separate re-acquirement and confirmation for every use of the application program. According to one example, the time interval and the number of uses may be set by the manufacturer of the hearing instrument via the access software platform; alternatively, or in addition, such limitations may be set by the third party service provider (for example, if the user has to pay for every use of the program). According to another example, the time interval and/or the number of uses may be adjustable by the user by acting on the hearing instrument or the personal communication device; for example, the user may select that he has to confirm the hearing instrument access by the application program only once (i.e. during the first use of the program), every time the program is used, or, for example, only once a week, etc. According to another example, also the HCP may set certain restrictions concerning time and number of uses, so as to require re-confirmation (such restriction may be set via the fitting software; the information that the service is limited would reach the access platform together with the L4 certificate; alternatively, it could go with the same push mechanism either via the manufacturer server or the third party server as already mentioned above for the confirmation withdrawal by the HCP).

Another reason for repetition of the initialization procedure for an application program may be replacement of the hearing instrument (i.e. the user buys a new hearing instrument) or that the firmware of the hearing instrument is updated by the manufacturer, offering additional or modified services.

As already mentioned above, the involved devices, namely the hearing instruments and the personal communication device, may be identified by the access software platform and the manufacturer access service via respective identifiers associated with the devices. However, alternatively, device identifier groups or user logins could be used for identifying the devices.

Figure 5:
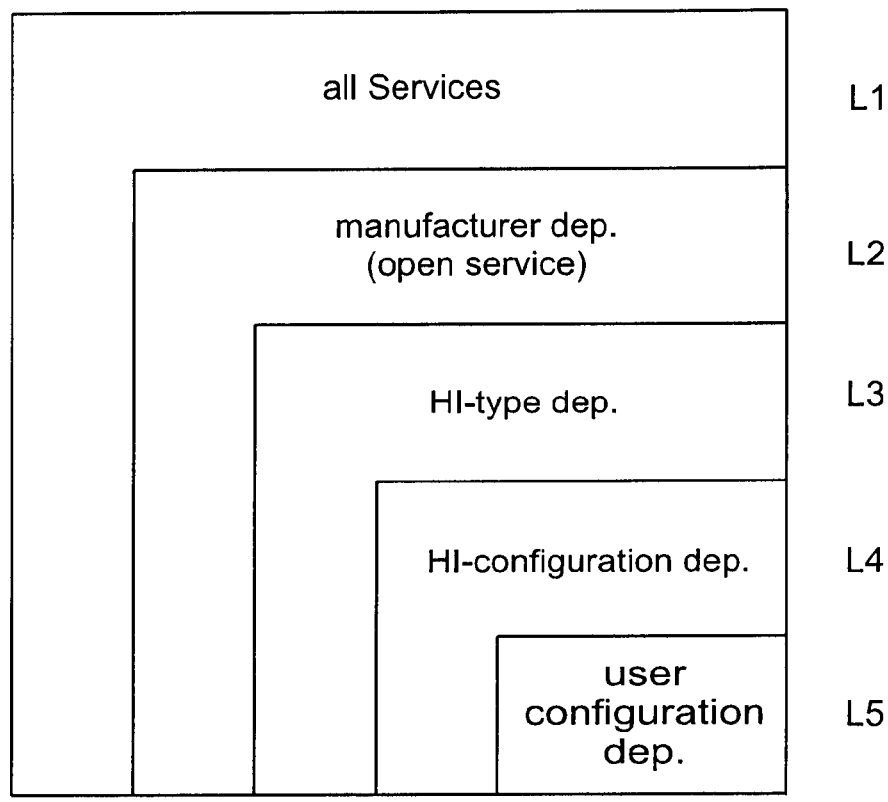
FIG. 5 is a schematic representation of the confirmation levels to be used in an example of the invention.

In FIG. 5 a schematic representation of hierarchically structured confirmation levels L1 to L5 is shown, wherein L1 relates to the entity of all possible hearing instrument services, including, for example, the services used by the manufacturer for proprietary application programs or tools and on internal levels for developers and during production. L2 relates to the open services, i.e. those services which are made available, through the access software platform, to third party application program developers. L3 relates to those services which are available for a given hearing instrument type and version. L4 relates to the services enabled by the HCP, i.e. services customized, activated or deactivated by the HCP for the respective user of the hearing instrument (i.e. L4 relates to configuration dependent services). L5 relates to the services enabled by the user, for example by corresponding disabling/enabling action via an application program or hearing instrument user controls.

For example, microphone access may require approval by the user and thus is on the confirmation level L5; likewise, access to data in the hearing instrument obtained by data logging requires L5 approval (by the user). According to a further example, toggle button short press access may require L3 approval (i.e. the service must be available on the respective hearing instrument), and toggle button long press may require L4 approval (i.e. approval by the HCP responsible for fitting of the hearing instrument).

According to one example, the user experience with regard to utilizing a third party service, such as an agenda application program, may be as follows: The user installs the certified agenda application provided by a third party service provider from an application store on his smartphone. With the agenda application, the user may get notifications from the agenda application directly to his earphones. If the user wants to use his hearing instrument with the agenda application, the user has to configure the agenda application (on his smartphone) in a manner so as to use the hearing instrument; thereby, the user may configure the service priority in the agenda application for the hearing instrument. The agenda application then automatically registers itself in the access software platform, connects to the hearing instrument and then goes through the initialization procedure, during which the user has to grant access for the agenda application to the required services of the hearing instrument by providing for the required L5 confirmations. Once the initialization procedure has been finalized, the user can enjoy the agenda application on his hearing instrument.

The invention claimed is:

1. A hearing device, the hearing device comprising:
a speaker;
a battery;
an interface configured to communicate wirelessly with a mobile device;
a processor coupled to a memory, wherein the memory stores instructions that, when executed by the processor, cause the hearing device to perform operations, the operations comprising:
receiving a request to access a function for the hearing device, access data for the hearing device, or modify the hearing device,
wherein the request is associated with a third party,
wherein the request is received from the mobile device via a wireless link between the mobile device and the hearing device,
wherein the wireless link is based on a pairing between the mobile device and the hearing device,
wherein a cloud computing service determined that the third party has permission to perform the request based on an authorization procedure performed by the third party and a hearing device manufacturer, wherein the authorization procedure includes the third party receiving a certification from the hearing device manufacturer,
wherein the permission is based a plurality of hierarchically structured service access levels and user granted permission,
wherein the plurality of hierarchically structured service access levels are associated with access of different hardware components of the hearing device or control of different functions of the hearing device and the certification; and
in response to the request, granting access to the function, granting access to the data, or modifying the hearing device.

2. The hearing device of claim 1, wherein the request is associated with at least one of the following:
a classifier for the hearing device;
medical data collected by the hearing device;
audio received by microphone;
installing software on the hearing device;
modifying software on the hearing device;
the battery status; or
a combination thereof.

3. The hearing device of claim 1, wherein the mobile device is a mobile device with an application.

4. A method of operating a hearing device, the method comprising: establishing a wireless link between a mobile device and a hearing device; pairing the mobile device and the hearing device via the wireless link; assigning a service access confirmation level to a hearing device service, wherein the service access confirmation level was selected from a plurality of hierarchically structured service access confirmation levels, wherein each level of the plurality of hierarchically structured service access confirmation levels grants a different level of access to a hearing device or hearing device information, wherein each level of the plurality of hierarchically structured service access levels are associated with access of different hardware components of the hearing device or control of different functions of the hearing device and a certification; granting or denying a third party service access to the assigned level based on user confirmation and a service authorization process, wherein the service authorization process comprises: obtaining confirmation of the service access confirmation level assigned to the hearing device service, submitting a service certification request for the hearing device service to a manufacturer access service, the service certification request including the obtained confirmations of the service access confirmation level assigned to the hearing device service, and determining whether the service certification request includes required confirmation of the service access confirmation level assigned to the hearing device service.

5. The method of claim 4, wherein the hearing device is configured to communicate via a wireless communication interface.

6. The method of claim 4, wherein the hearing device service comprises at least one of the following:
streaming of audio signals captured by a microphone arrangement of the hearing device;
providing access to data indicative of a status of the hearing device or data logged during use of the hearing device;
providing access to adjustment of operation parameters of the hearing device; or
processing of audio signals supplied from the hearing device.

7. The method of claim 4, wherein the third party service comprises at least one of the following:

providing speech translation services, wherein an audio signal speech input captured by the hearing device is translated into an audio signal speech output in another language;

providing medical data; or generating speech messages to be supplied as an audio signal output to an output transducer of the hearing device.

8. A non-transitory computer readable medium storing instructions that when executed by a processor cause a machine to perform operations, the operations comprising: establishing a wireless link between a mobile device and a hearing device; pairing the mobile device and the hearing device via the wireless link; assigning a service access confirmation level to a hearing device service, wherein the service access confirmation level was selected from a plurality of hierarchically structured service access confirmation levels, wherein each level of the plurality of hierarchically structured service access confirmation levels grants a different level of access to a hearing device or hearing device information wherein each level of the plurality of hierarchically structured service access levels are associated with access of different hardware components of the hearing device or control of different functions o the hearing device and a certification; granting or denying a third party service access based on user confirmation and a service authorization process, wherein the service authorization process comprises: obtaining confirmation of the service access confirmation level assigned to the hearing device service, submitting a service certification request for the hearing device service to a manufacturer access service, the service certification request including the obtained confirmations of the service access confirmation level assigned to the hearing device service; and determining whether the service certification request includes required confirmations of the service access confirmation level assigned to the hearing device service.

9. The non-transitory computer readable medium of claim 8, wherein the hearing device is configured to communicate via a wireless communication interface.

10. The non-transitory computer readable medium of claim 8, wherein the hearing device service comprises at least one of the following:

streaming of audio signals captured by a microphone arrangement of the hearing device;

providing access to data indicative of a status of the hearing device or data logged during use of the hearing device;

providing access to adjustment of operation parameters of the hearing device; or processing of audio signals supplied from the hearing device.

11. The non-transitory computer readable medium of claim 8, wherein the third party service comprises at least one of the following:

providing speech translation services, wherein an audio signal speech input captured by the hearing device is translated into an audio signal speech output in another language;

providing medical data; or generating speech messages to be supplied as an audio signal output to an output transducer of the hearing device.

\* \* \* \* \*